US012773773B1

(12) United States Patent
Lostlen

(10) Patent No.: US 12,773,773 B1
(45) Date of Patent: Oct. 27, 2026

(54) CONTOUR AND PROFILE MARKING DEVICE

(71) Applicant: Tad K. Lostlen, Morongo Valley, CA (US)

(72) Inventor: Tad K. Lostlen, Morongo Valley, CA (US)

( * ) Notice: Subject to any disclaimer, the term of this patent is extended or adjusted under 35 U.S.C. 154(b) by 412 days.

(21) Appl. No.: 18/374,632

(22) Filed: Sep. 28, 2023

Related U.S. Application Data

(60) Provisional application No. 63/443,196, filed on Feb. 3, 2023.

(51) Int. Cl.
*B25H 7/04* (2006.01)

(52) U.S. Cl.
CPC .................................... *B25H 7/045* (2013.01)

(58) Field of Classification Search
CPC ..... B43L 7/00; B43L 7/10; B43L 7/12; G01B 3/14; G01B 3/00; G01B 5/00; G01B 5/02; Y10T 408/56245; B25H 7/045
USPC ......... 33/452, 528, 562, 451, 456, 474, 526, 33/527
See application file for complete search history.

(56) References Cited

U.S. PATENT DOCUMENTS

| | | | | |
|---|---|---|---|---|
| D136,978 S * | 1/1944 | Tomasini | 33/561.1 | |
| 4,380,872 A * | 4/1983 | Moran | G01B 3/30 | 33/529 |
| 5,388,339 A * | 2/1995 | Roach | B43L 7/12 | 33/480 |
| 5,768,793 A * | 6/1998 | Fields | G01B 5/02 | 52/749.11 |
| 5,807,036 A * | 9/1998 | Lostlen | B23B 47/287 | 408/72 R |
| 7,302,763 B1 * | 12/2007 | Matthews | G01B 3/14 | 33/562 |
| 8,261,462 B2 * | 9/2012 | Coyle | A47G 1/205 | 33/669 |
| 9,237,819 B1 * | 1/2016 | Marks | A47G 1/24 | |
| 9,366,041 B2 * | 6/2016 | Saravanos | E04F 21/0076 | |
| 10,065,305 B2 * | 9/2018 | Lostlen | B25H 7/02 | |

(Continued)

OTHER PUBLICATIONS

YouTube. (Jan. 26, 2024). True Position Tools Cabinet Plumbing Jig How it Works. YouTube. https://www.youtube.com/watch?v=p-3ghUdqCAc.*

(Continued)

*Primary Examiner* — Peter J Macchiarolo
*Assistant Examiner* — Anna Josephine Saunders
(74) *Attorney, Agent, or Firm* — Leavitt Eldredge Law Firm; Richard Eldredge

(57) ABSTRACT

A contour and profile marking device for providing improved precision when marking a material's profile from one surface to another, comprising a horizontal crossbar with an elongated open channel, one or more vertical drop arms with an elongated open channel, split into Y-shape on one end and a tongue on another end, and removably secured onto the horizontal crossbar with a knob, a plurality of snap-on pivot attachments, a plurality of rotating marker attachments, a plurality of offset wires, wherein each of the said rotating marker attachments comprising open slots to receive each of the offset wires wherein each of the said rotating marker attachments can be removably attached to the tongue of the said vertical drop arm by coupling to each of the snap-on pivot attachments through a fastener.

9 Claims, 9 Drawing Sheets

(56) References Cited

U.S. PATENT DOCUMENTS

| | | | | |
|---|---|---|---|---|
| 11,660,685 | B1 * | 5/2023 | Lostlen | B23B 47/287 606/88 |
| 2006/0000102 | A1 * | 1/2006 | Lawson | G01B 3/14 33/562 |
| 2010/0095543 | A1 * | 4/2010 | Inthavong | H02G 1/00 33/528 |
| 2016/0101473 | A1 * | 4/2016 | Lostlen | B23B 47/287 408/115 R |
| 2017/0066125 | A1 * | 3/2017 | Lostlen | B25H 7/02 |
| 2022/0266444 | A1 * | 8/2022 | Baggott | B25H 7/04 |

OTHER PUBLICATIONS

Cabinet plumbing jig: True position tools. (n.d.). https://truepositiontools.com/product/cabinet-plumbing-jig/.*

* cited by examiner

CONTOUR AND PROFILE MARKING DEVICE

CROSS-REFERENCE TO RELATED APPLICATIONS

This application claims the benefit of U.S. Provisional Application 63/443,196, filed Feb. 3, 2023, which is hereby incorporated by reference in its entirety.

BACKGROUND

1. Field of the Invention

The present invention relates generally to marking devices, and more specifically to a contour and profile marking device with offset wires that provides improved precision for marking a material's contours and profile onto another material.

2. Description of Related Art

A marking device is generally used to mark out lines for cutting or other operations. The purpose of the marking device is to scribe a line parallel to a reference edge or surface. It is used in joinery and sheet metal or carpentry operations. The rulers are generally used as marking devices to make markings of a material's profile onto another material. The user will then remove the marking device and proceed to cut and shape the latter material.

One of the problems commonly associated with existing marking devices is limited precision and reverse transposing measurement when transferring it to an object and accurately positioning the center of a pipe of one diameter into a hole or a larger diameter workpiece. For example, it is common for the user to shift slightly while holding the marking device and/or while making markings on the material, and often requires more time and effort. Such shifting can lead to slight variations and thus cause misalignment.

Accordingly, it is an objective of the present invention to provide a contour and profile marking device that addresses the limitations discussed above.

DESCRIPTION OF THE DRAWINGS

The novel features believed to be characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
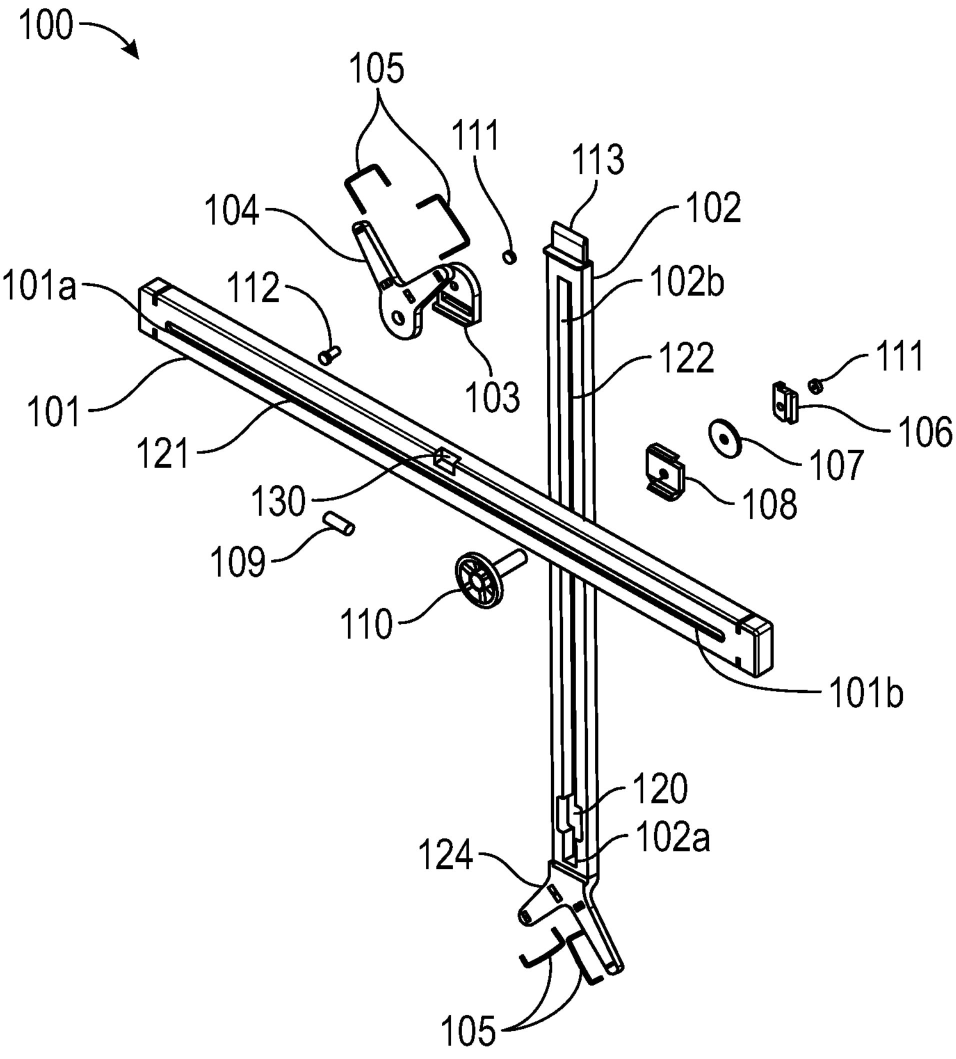
FIG. 1 is an exploded view of a contour and profile marking device in accordance with a preferred embodiment of the present application.

While the contour and profile marking device and method of use of the present application are susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the contour and profile marking device and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The contour and profile marking device and method of use in accordance with the present application overcome one or more of the above-discussed problems commonly associated with conventional marking devices. Specifically, the present invention provides a contour and profile marking device for improved precision when marking a surface's contours and profile onto another surface with minimal errors. These and other unique features of the system and method of use are discussed below and illustrated in the accompanying drawings.

The contour and profile marking device and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments are expressly contemplated herein so that one of ordinary skill in the art would appreciate from this disclosure that the features, elements, and/or functions of one embodiment may be incorporated into another embodiment as appropriate unless described otherwise.

It is an object of the contour and profile marking device to transfer a plurality of contours and profiles of different sizes and shapes from one surface to another. The openings for a sink cabinet typically have a hot and a cold water supply line in addition to a drain pipe with an outlet for garbage disposal. The back of the cabinet therefore typically requires at least four holes. For a quick installation, an installer can simply cut the majority of the back surface of a cabinet. While this will add access to the plumbing, it provides a large opening where material can fall between the cabinet and the wall, and bugs can easily pass back and forth in and out of the cabinet.

It is another object of the contour and profile marking device to have offset wire locators for both the size and the center position. In the case of a pipe outlet, determining the diameter and the center can be difficult as it is measured using tape. The contour and profile marking device can have offset wire indicia that identify the size and center position, allowing an installer to simply mark the location using a pencil, without requiring additional measurements.

It is still another object of the contour and profile marking device to be able to operate around obstructions with multiple drop arms. In the case of a kitchen, the water supply and drain can be in line with each other. The location of a drain pipe between a hot and a cold water pipe can be difficult with other marking systems. Because the disclosed system allows for great versatility to operate around obstructions and other hole-opening locations.

The preferred embodiment herein described is not intended to be exhaustive or to limit the invention to the precise form disclosed. It is chosen and described to explain the principles of the invention and its application and practical use to enable others skilled in the art to follow its teachings.

Referring now to the drawings wherein reference characters identify corresponding or similar elements throughout the several views, FIGS. 1-10 depict different views of a contour and profile marking device 100 and its method of use in accordance with preferred embodiments of the present application. It will be appreciated that the contour and profile marking device 100 overcomes one or more of the above-listed problems commonly associated with conventional contour and profile marking devices.

In the contemplated embodiment, the contour and profile marking device 100, as shown in FIG. 1, include a substantially horizontal crossbar 101, one or more substantially vertical drop arm 102, a plurality of snap-on pivot attachment 103, a plurality of rotating marker attachment 104, a plurality of offset wires 105, one or more drop arm retainer 106, a plurality of rubber washer 107, a plurality of washer plate 108, a level bubble 109, a plurality of knobs 110, a plurality of nylock nut 111, and a plurality of fastener 112. It should be appreciated that other components of the contour and profile marking device 100 may be included without departing from the scope of the present application.

Figure 5:
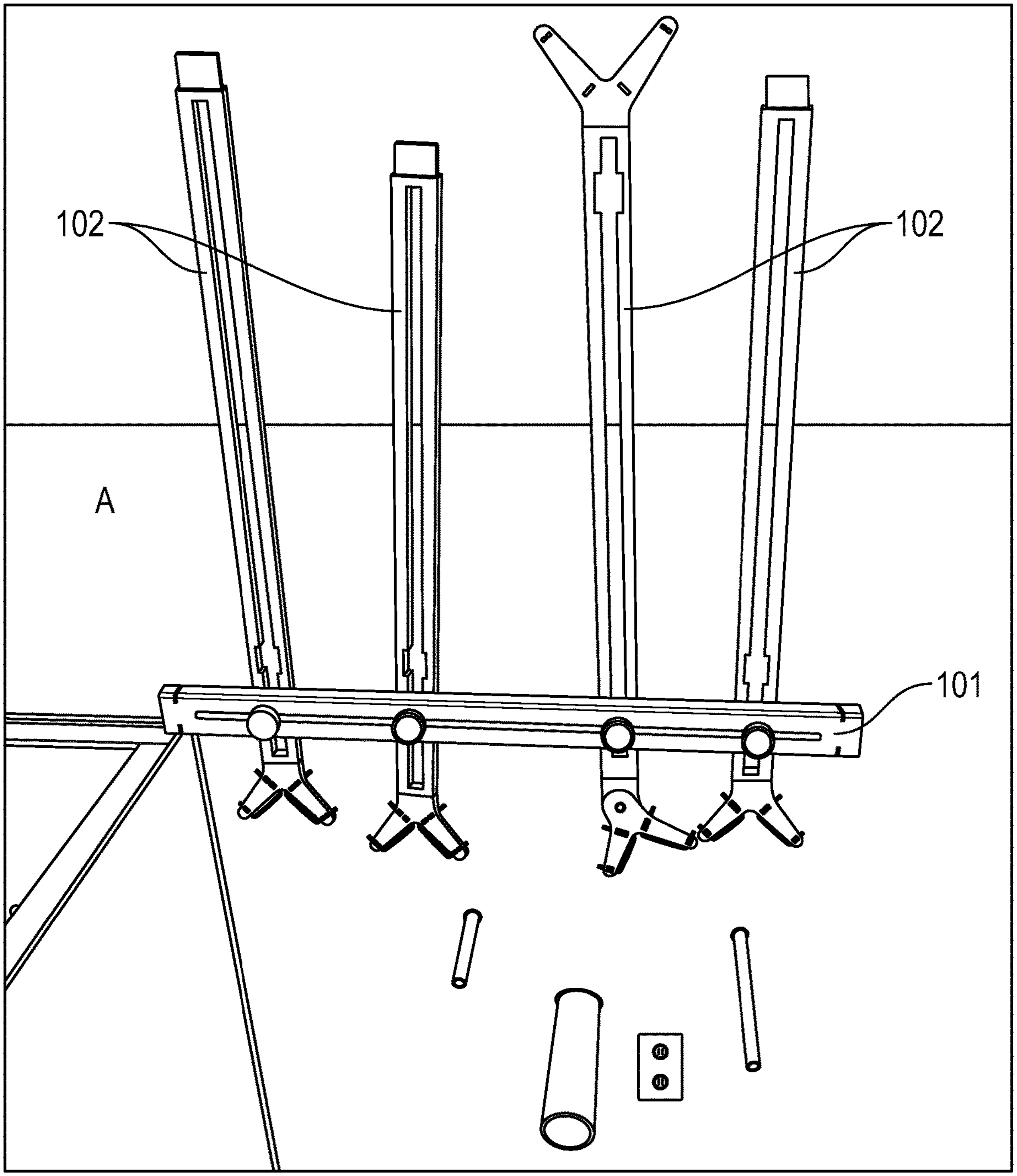
FIG. 5 is the contour and profile marking device aligned on a horizontal edge in a raised position on surface A.

The horizontal crossbar 101 includes an open channel 121 extending from a first end 101*a* to a second end 101*b*. The horizontal crossbar 101 also includes an opening 130 configured to fit a level bubble 109 therein. The horizontal crossbar 101 aligns with a horizontal edge of the top surface of sheetrock or any level line drawn as a reference. The horizontal crossbar 101 may be located on a flat surface with the help of fasteners. As shown in FIG. 5, the fastener is a nail or screw, clamp, or pushpin as part of crossbar 101, that is placed on the top surface of the sheetrock, cabinet, or any other suitable flat surface.

A plurality of vertical drop arms 102 can be secured to the horizontal crossbar 101. The vertical drop arms 102 can be positioned either side up or down. While the orientation of the vertical drop arms 102 to the horizontal crossbar 101 is predominantly shown in an orthogonal vertical or horizontal relationship these components can be connected in an angular relationship to move the components around obstructions to locate all of the openings in a single set-up.

Each vertical drop arm 102 includes an open channel 122 extending from a first end 102*a* to a second end 102*b*. The vertical drop arms 102 includes a notch 120 that feeds into the open channel 122. The vertical drop arm 102 can include the notch 120 at any one or both ends, preferably on the first end 102*a*. The first end 102*a* further split into Y-shape 124 with each arm extending away from the first end 102*a* at a predetermined angle. Each arm includes two open slots extending across the arm to receive each of the offset wire 105 protruding ends as shown in FIG. 1.

Figure 2:
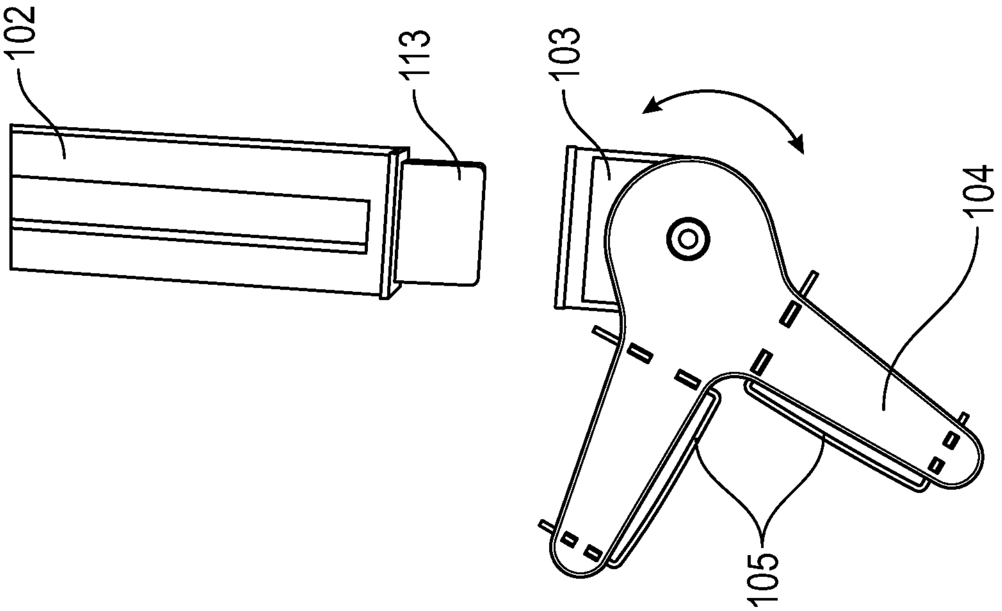
FIG. 2 is a closeup front view of the rotating marker attachment and offset wires.

The second end 102*b* of the vertical drop arm includes a tongue 113 extending therefrom. The tongue 113 is configured to receive a snap-on pivot attachment 103. The snap-on pivot attachment 103 and a rotating marker attachment 104 are removably coupled together using a fastener 112. The fastener 112 can be tightened at different levels and used to couple the rotating marker attachment 104 with the snap-on pivot attachment 103 as per the requirement. The snap-on pivot attachment 103 also includes a tongue 123 configured to removably attach to the tongue 113 of the vertical drop arm 102 as shown in FIGS. 2-3.

Figure 10:
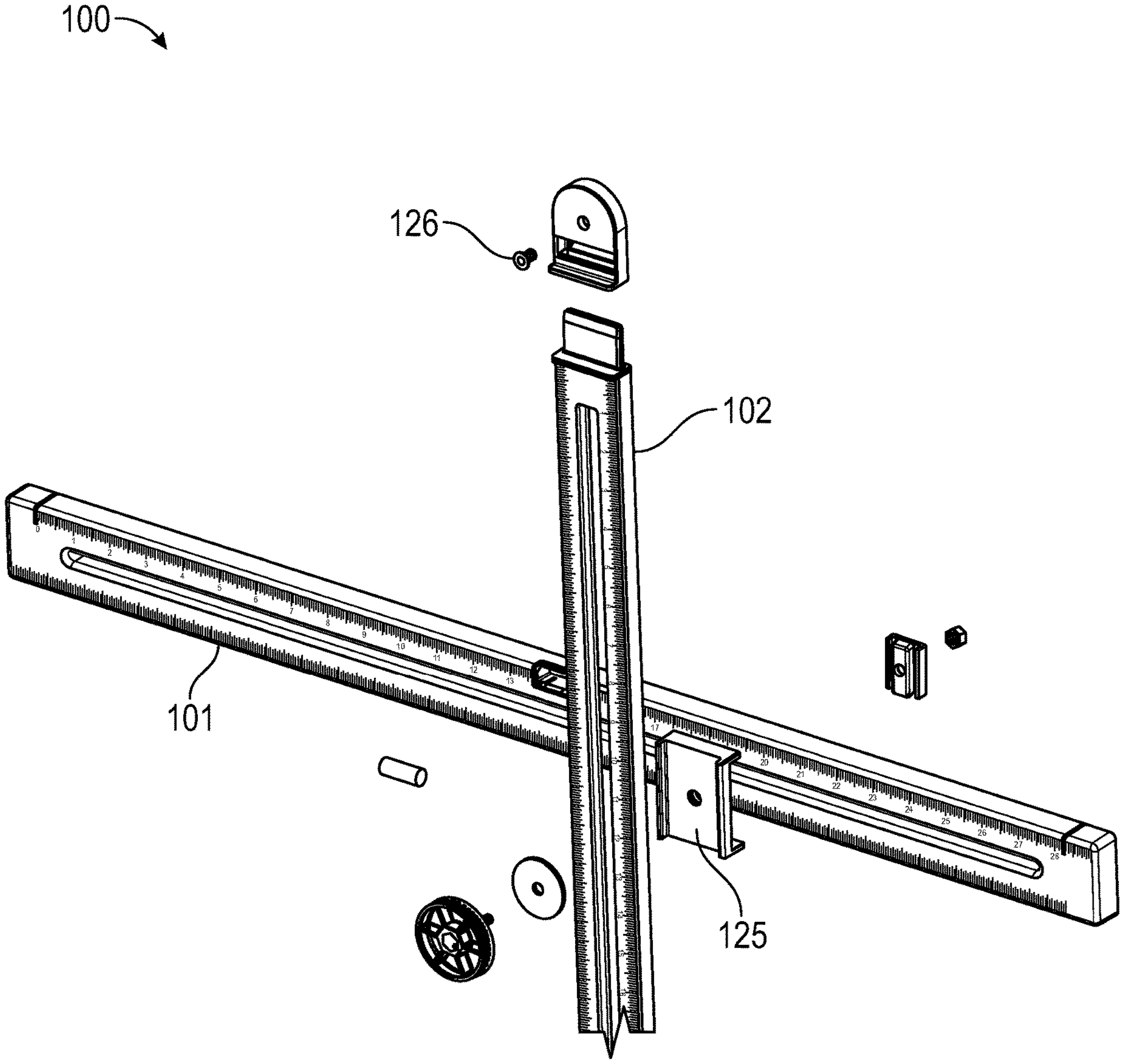
FIG. 10 is an exploded view of a contour and profile marking device in accordance with other embodiments of the present application.

The contour and profile marking device 100 can further include a snap-on attachment with one or more drill bushings 126 for guiding the drill bits that can be secured onto the required surface and can be drilled through as shown in FIG. 10.

The rotating marker attachment 104 can be a Y-shaped attachment with each arm extending away from the second end 102*b* at a predetermined angle. Each arm includes two open slots extending across the arm to receive each of the offset wire 105 protruding ends as shown in FIG. 1.

Figure 3:
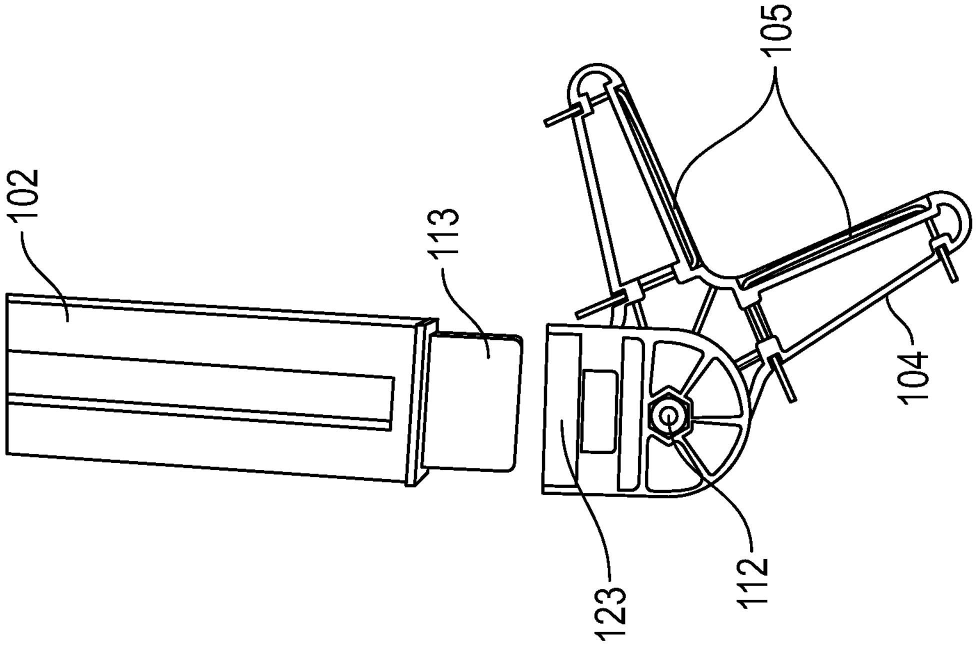
FIG. 3 is a closeup back view of the rotating marker attachment and offset wires.

Each of the arms of the rotating marker attachment 104 further includes a shelf to snugly fit and receive the offset wire 105 without extending outward on the arm as shown in FIG. 3. The shelf is typically of the same size as the offset wire 105. The offset wire 105 can snugly fit into each arm with the help of an extending bump in the open slots as shown in FIGS. 2-3. The offset wires can be adjusted in and out of the open slots to facilitate marking profiles around the articles such as pipes or any other structures of different sizes and shapes while marking the contours and profiles.

In the contemplated embodiment, the rotating marker attachment 104 can be an attachment in any shape or size, preferably for marking the contours and profiles in one or more dimensions.

In the contemplated embodiment, the offset wires can also be in any shape or size and can include one or more offset wires of different sizes and shapes.

Each vertical drop arm 102 is removably secured to the horizontal crossbar 101 using a knob 110, along the open channel 121 of the horizontal crossbar 101, and the open channel 122 of the vertical drop arm 102 using a knob 110. The knob 110 is first placed through channel 121 of the horizontal crossbar 101, on the other side a washer plate 108, a rubber washer 107, and a drop arm retainer 106 are secured to the knob and the vertical drop arm 102 is pushed down the drop arm retainer 106 at the notch 120 and the vertical drop arm 102 slid down across its open channel 122, and the knob 110 then secured with the nylock nut 111.

It should be appreciated that the dimensions of the contour and profile marking device 100 can be adjusted such that the contour and profile marking device can be used for various projects such as cabinetry, drywalling, flooring, roofing, and paneling, among others. For example, as shown in FIG. 1, the horizontal crossbar 101 is securely attached to the front portion of the drop arm 102, making it suitable for cabinetry purposes.

In another contemplated embodiment, the horizontal crossbar 101 can be securely attached by using a bracket 125 to the rear portion of the drop arm 102, making it suitable for drywalling and paneling as shown in FIG. 10. By using a bracket 125, the horizontal crossbar 101 and the drop arm 102 can also be attached at a 90-degree angle for measuring and transferring X and Y axis.

The horizontal crossbar 101 can be removably secured to each of the vertical drop arms 102 by any suitable attachment means including but not limited to a knob, squeeze release latch, snap lock, snap fit, etc.

It should also be appreciated that one of the unique features believed characteristic of the present application is that it provides precision marking of contours and profiles from one surface to another and can save time and energy in doing the same with minimal errors.

Figure 4:
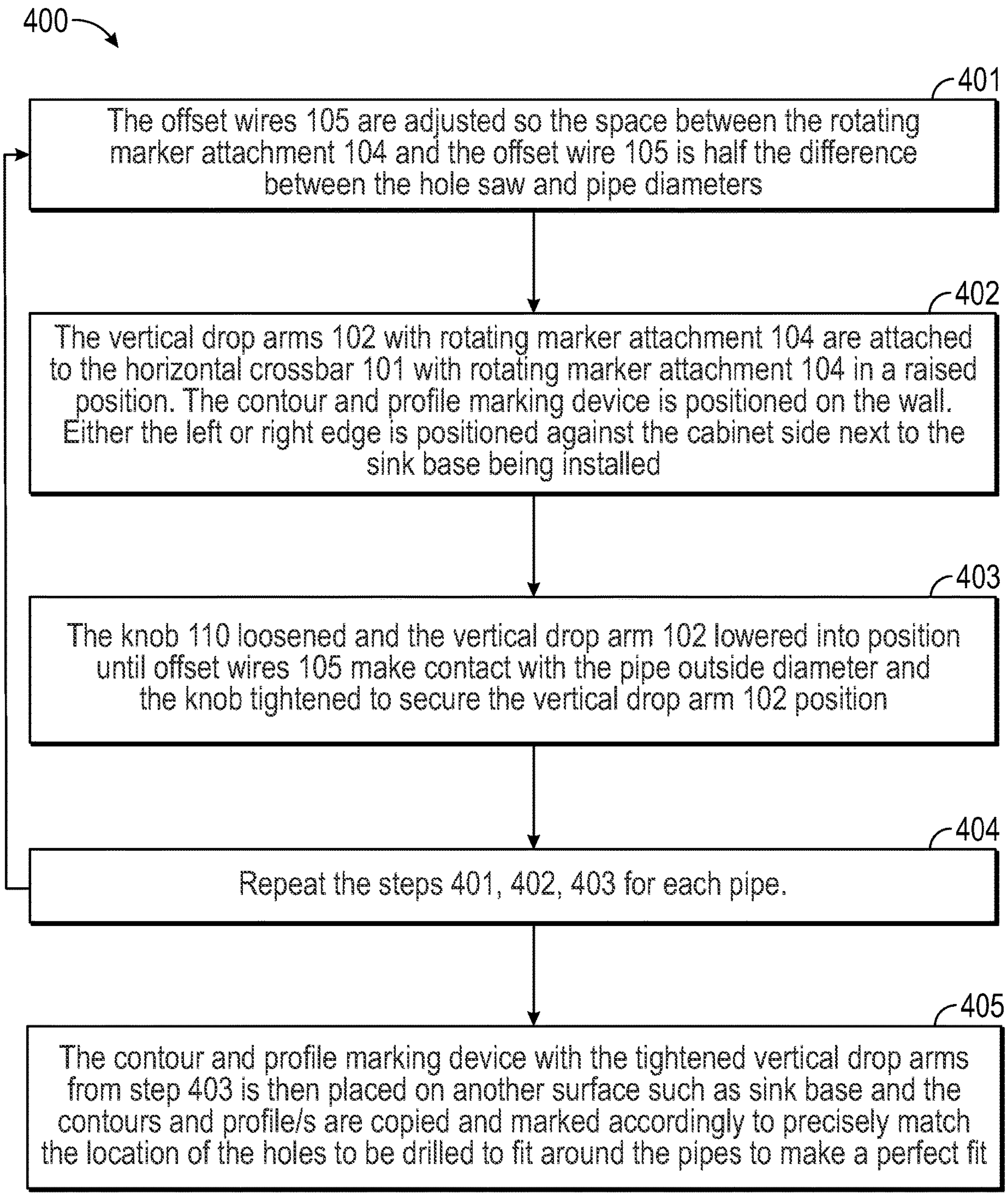
FIG. 4 is a flowchart of a method of use of a contour and profile marking device in accordance with the present application.

In FIG. 4, a flowchart 400 depicts a method of using a contour and profile marking device to make markings around a pipe in accordance with the present application.

As shown in step 401, the offset wires 105 are adjusted so the space between the rotating marker attachment 104 and the offset wire 105 is half the difference between the hole saw and pipe diameters. For example—a 2¾" hole saw, minus 2¼" outside diameter pipe, equals ½". The offset wires 105 are set to ¼" from the face of rotating marker attachment 104 to the outside of the offset wires 105 faces. The pipe outside diameter is measured and the desired hole saw size is selected. The offset wires 105 are positioned to half of the dimension between the hole saw and pipe outside diameter.

Figure 6:
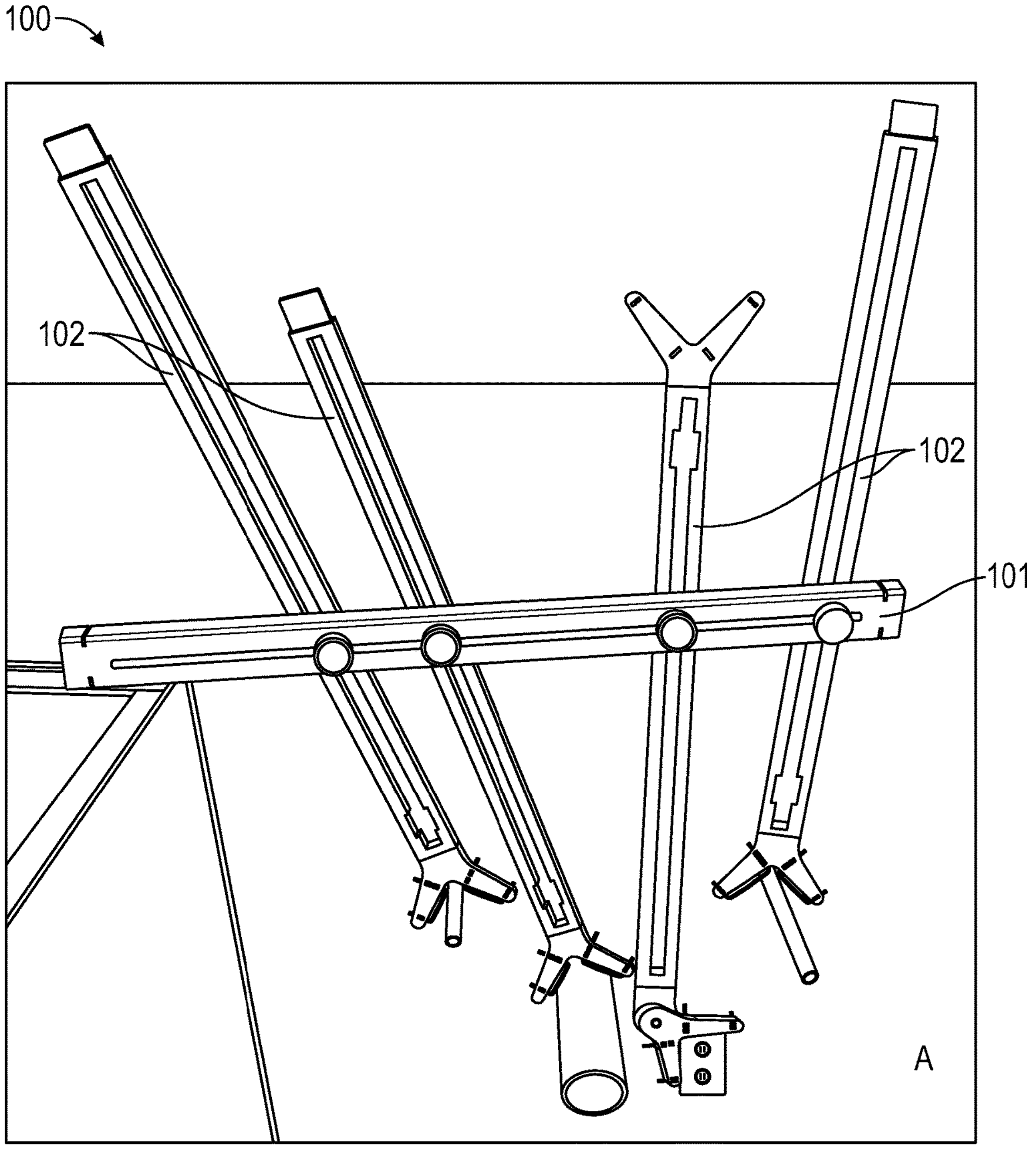
FIG. 6 is the contour and profile marking device aligned on the horizontal edge in a lowered position on surface A.
Figure 7:
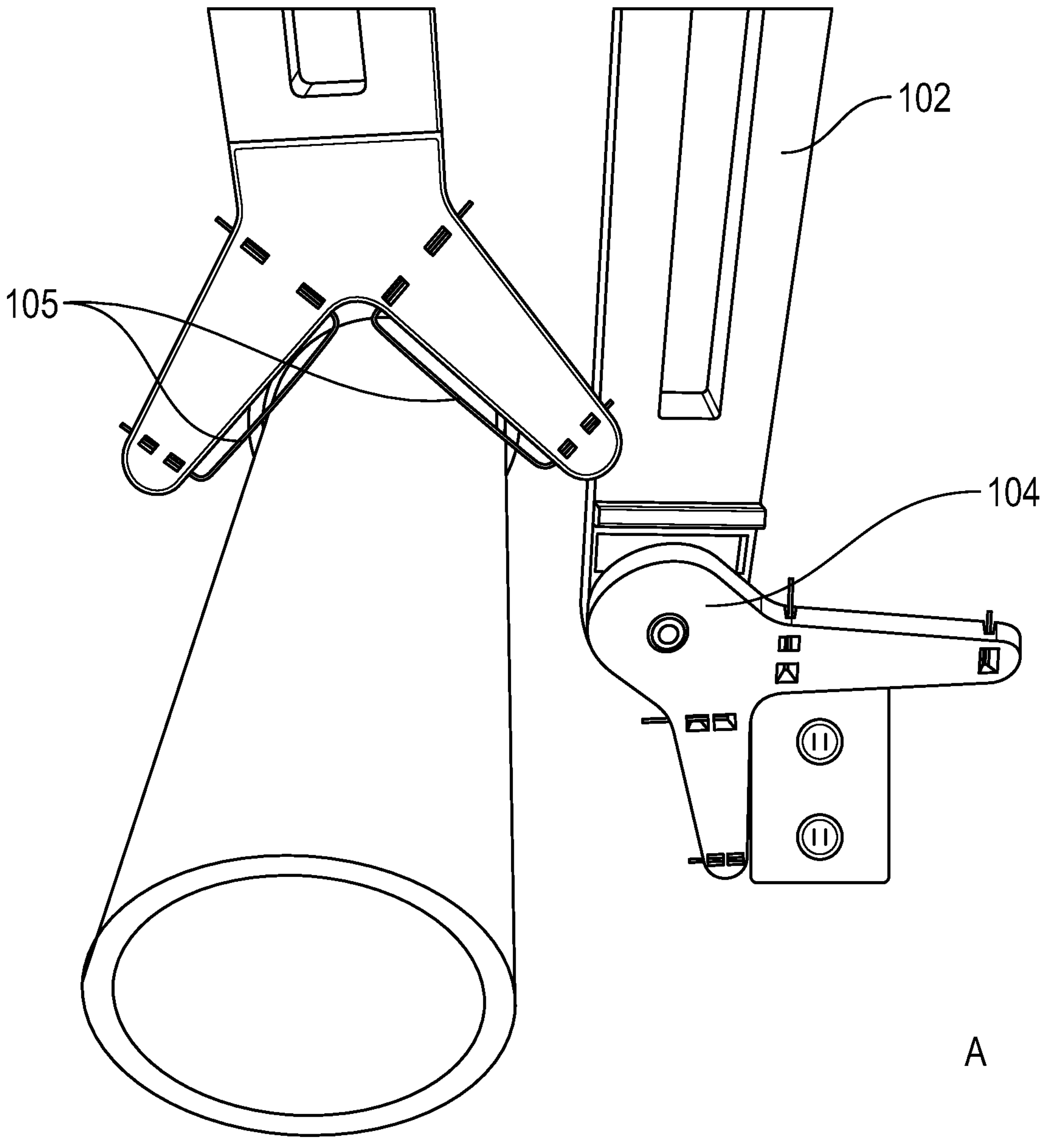
FIG. 7 is a front view of the offset wires making contact with the pipe outside diameter and the offset wires retracted for marking the electrical outlet on surface A.
Figure 8:
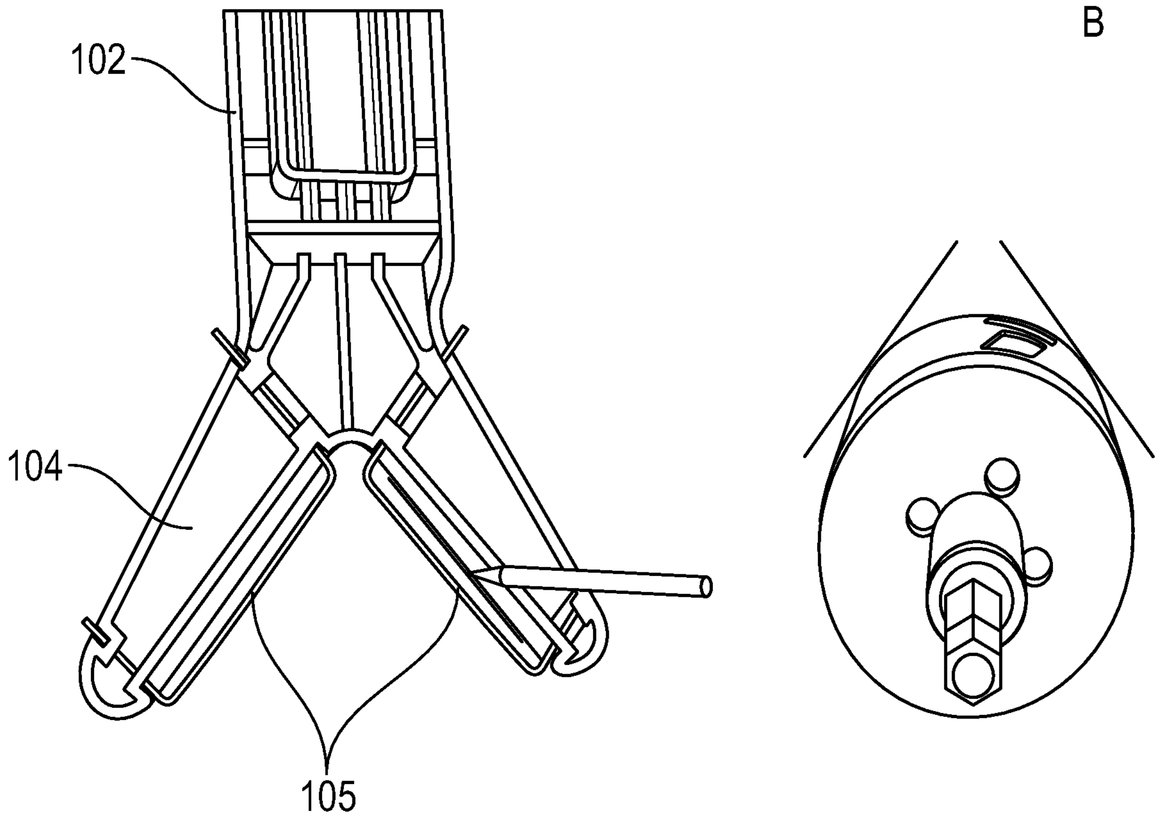
FIG. 8 is the contour and profile copying or transfer onto surface B using pencil marks on surface B.

We can find the center without measuring the center of a radius pipe. The offset wires 105 touch the pipe. Two pencil marks along rotating marker attachment 104 are two contact points where the hole saw aligns. Distance from the outside of the offset wires 105 and rotating marker attachment 104 face where pencil marks are made will determine the space around the pipe after drilling the hole, as shown in FIGS. 5-7. The offset wires of the present invention facilitate contacting pipes of different diameters with minimal effort while accurately determining the center of the pipe/s.

As shown in step 402, the vertical drop arms 102 with rotating marker attachment 104 are attached to the horizontal crossbar 101 with rotating marker attachment 104 in a raised position as shown in FIG. 5 on surface A. The contour and profile marking device is positioned on the wall. Either the left or right edge is positioned against the cabinet side next to the sink base being installed.

Alternately the contour and profile marking device index marks can be aligned with a cabinet layout pencil mark on the wall in the event there isn't a cabinet to rest on by using two fasteners and securing them to the wall. The fasteners can be custom-designed to hold the edge of the horizontal crossbar 101, and it is aligned using center marks or using a side stop index line, or the end of the horizontal bar. The fastener can be a pushpin added to crossbar or standard cabinet installing screws can secure the device.

In the contemplated embodiment, the contour and profile marking device can further include length-measuring indicia or markings in centimeters, inches, etc. on the horizontal crossbar 101 and the vertical drop arm 102 as shown in FIG. 10.

The knob 110 loosened and the vertical drop arm 102 lowered into position until offset wires 105 make contact with the pipe outside diameter and the knob tightened to secure the vertical drop arm 102 position, as shown in step 403.

The steps 401, 402, 403 can be repeated for each pipe, as shown in step 404.

Figure 9:
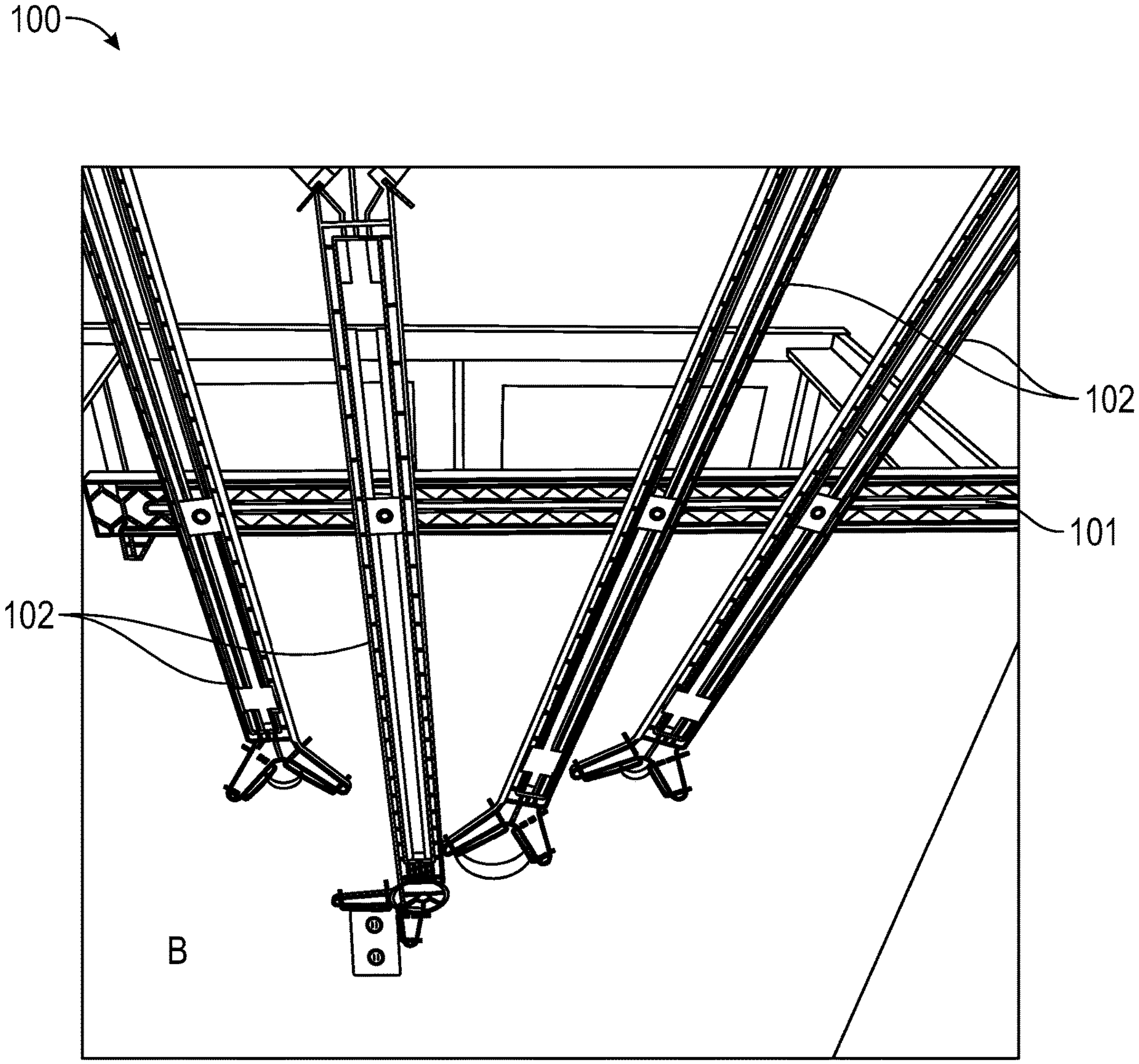
FIG. 9 is surface B with the contours and profile copied from surface A, using the contour and profile marking device of the present invention.

The contour and profile marking device with the tightened vertical drop arms from step 403 is then placed on surface B and the contours and profile/s are marked accordingly to precisely match the location of the holes to be drilled to fit around the pipes and make a perfect fit, as shown in step 405. The contour and profile marking device can be used to precisely copy any kind of contours and profiles from one surface to another, as shown in FIG. 9.

The rotating marker attachment 104 can be used when more adjustment is required for electrical outlets as shown in FIG. 7.

The offset wires 105 can be retracted all the way and used to transfer two edges of the electrical outlet box. When the electrical outlet box extends into the cabinet, the offset wires 105 can be used to allow clearance.

The contour and profile marking device of the present invention may further include customized marker attachments such as receptacle outlets, standard-sized outlets, pipe sizes, or other suitable outlets or openings.

The contour and profile marking device 100 can be placed on the back of the drywall or paneling or sheetrock or flat surface, as shown in FIGS. 4-5, aligned with the left edge stop with the left side of the sheetrock or any flat surface. Alternately centerline mark on the horizontal crossbar can be aligned with the center of the sheetrock or flat surface making a pencil mark or edge stop flush positioned with the side of the sheetrock or flat surface either left or right.

The contour and profile marking device 100 can be used to mark along the edges of the rotatory marker attachment to create an upside-down V-shaped pencil mark on the back of the sheetrock or flat surface. The hole saw edge can be aligned with both lines of V pencil marks and the hole is drilled. Pipes can be positioned in the center of the hole after the sheetrock or flat surface has been installed onto the layout marks.

The outlet box can be aligned with marker pencil marked edges and the outlet box or other square or rectangle objects can be traced. A saw can be used to cut out outlet receptacles or other shapes with straight edges. The rotatory marker attachments can be used to achieve more adjustment.

The vertical drop arm 102 can accept rotatory marker attachments in other shapes and sizes and can be used to transfer any desired shape. The vertical drop arms can be manufactured in two pieces (jointed or hinged) to achieve more adjustment. The horizontal crossbar 101 and the vertical drop arms 102 can be collapsible or extendable in length, the contour and profile marking device 100 can further include visual or audio indicators of the alignment, and the rotatory marker attachment can be a swivel marker or rotatable in all directions and can be used for marking or gauging multiple dimensional contours and profiles.

The contour and profile marking device can be used to locate all of the openings and holes from one surface and can transfer the plurality of holes and locations to another surface like the back surface of a cabinet. The contour and profile marking device provides the solution for not only cabinets but can also be used with sheetrock, paper, plastic, wood, metal, stone, granite, marble, paneling, drywall, flooring, roofing, and other marking needs where the markings can be made to be copied on the same side or on the mirror side.

The contour and profile marking device can be made of any suitable material including hard durable plastic, wood, metal, or any composite blend thereof.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A contour and profile marking device, comprising:

a horizontal crossbar with an elongated open channel;

a plurality of knobs;

a bracket;

one or more vertical drop arms with an elongated open channel extend into one or more selected shapes on one end and a tongue on another end, and removably secured onto the horizontal crossbar with one or more knobs and optionally a bracket, the one or more vertical drop arms forms a Y-shaped ending;

a plurality of snap-on pivot attachments;

a plurality of rotating marker attachments;

a plurality of offset wires secured to the Y-shaped ending, the plurality of offset wires are adjusted relative to the Y-shaped ending, which in turn creates a gap between the plurality of offset wires and the Y-shaped ending;

wherein each of the said rotating marker attachments comprising open slots to receive each of the offset wires;

wherein each of the said rotating marker attachments can be removably attached to the tongue of the said vertical drop arm by coupling to each of the snap-on pivot attachments through a fastener;

wherein the snap-on pivot attachments have one or more drill bushings removably attached;

wherein the end shape of the vertical drop arm comprising open slots to receive each of the offset wires;

wherein the offset wires eliminate the need to measure the center of circular contours and profiles while copying and transferring them;

wherein the contour and profile marking device is used to precisely copy or transfer selected contours and profiles from one surface to another by selectively adjusting the offset wires.

2. The contour and profile marking device of claim 1, wherein the rotating marker attachments can be in one or more selected shapes and sizes.

3. The contour and profile marking device of claim 1, wherein the surface can include wood, paper, tile, stone, granite, marble, plastic, concrete, metal, or any composite blend or drywall, floor, roof, panel, sheetrock, or other flat surface.

4. The contour and profile marking device of claim 1, wherein the horizontal crossbar and vertical drop arms include length-measuring indicia on their surface.

5. The contour and profile marking device of claim 1, wherein the snap-on pivot attachments have one or more drill bushings removably attached to guide the drilling tools.

6. The contour and profile marking device of claim 1, wherein the offset wires can be in different shapes and sizes.

7. The contour and profile marking device of claim 1, further include audio, visual indicators of the alignment.

8. The contour and profile marking device of claim 1, wherein the rotatory marker attachment can be a swivel marker or rotatable in all directions for marking or gauging multiple dimensional contours and profiles.

9. The contour and profile marking device of claim 1, wherein the vertical drop arm can accept rotatory marker attachments in other shapes and sizes.

* * * * *